3,337,513
CADMIUM SALT CATALYTIC PROCESS
Ernest L. Kutch, Levittown, Stephen W. Osborn, Yardley, and Theodore F. Wells III, Morrisville, Pa., assignors to Thiokol Chemical Corporation, Bristol, Pa., a corporation of Delaware
No Drawing. Continuation of application Ser. No. 255,675, Feb. 1, 1963. This application Oct. 31, 1966, Ser. No. 591,032
21 Claims. (Cl. 260—79.7)

This application is a continuation of application S.N. 255,675 filed Feb. 1, 1963, now abandoned.

This invention relates to a novel process for the production of polyepisulfides of relatively high molecular weight. The polyepisulfides produced by the novel process of the present invention may be either homopolymers or interpolymers, depending upon whether one, or more than one, monomeric episulfide is used as a starting material. Particularly, the invention relates to the use of cadmium salt catalysts in the polymerization process.

It is an object of the invention to provide a process for making polyepisulfides having high molecular weights. It is another object of the invention to provide novel catalysts adapted to be used in such a polymerization process.

It has now been unexpectedly found that readily available cadmium salts, such as the hydroxides, sulfides, silicates, oxides, acetates, sulfates, and carbonates will effectively catalyze polymerizations of episulfides to form useful high molecular weight polymeric materials. These catalysts may be used singularly or in combination with one another. The catalysts of the present invention are preferably used in a particulate state. It has been found that, generally speaking, the finer the particle size the more reactive is the catalyst. The preferred particle size is of the order of less than one micron.

The present process is generally applicable to the polymerization of episulfide monomers. Typical monomeric episulfides polymerizable by this process are styrene sulfide, allylthioglycidyl ether, thioepichlorohydrin, thioglycidyl acrylate, thioglycidyl methacrylate, 3,4 - epoxy - 1,2-butylene sulfide, vinyl cyclohexene sulfide, butadiene monoepisulfide and alkylene sulfides such as cyclohexene, butylene sulfide (i.e., 2,3 - butylene sulfide, 1,2 - butylene sulfide) propylene sulfide and ethylene sulfide. Mixtures of two or more of these monomeric episulfides may also be used as starting materials and interpolymerized. In general, the homopolymers and interpolymers produced according to the present invention are insoluble in water and the polymers made entirely or principally from ethylene sulfide are substantially completely insoluble in solvents such as benzene, acetone, hexane and methylene chloride. That is, they are soluble to the extent of less than 1% by weight in the solvents.

The homopolymers of ethylene sulfide produced by this process are crystalline solids having high melting points. They are useful as high temperature molding materials, and when melted they can be formed into flexible films. Interpolymers of ethylene sulfide and propylene sulfide and/or butylene sulfide produced by the present process can be used to form valuable extrudable materials. When melted, the solid interpolymers can also be formed into flexible films. Interpolymers of propylene sulfide and/or butylene sulfide and allylthioglycidyl ether, thioepichlorohydrin, thioglycidyl acrylate, thioglycidyl methacrylate, vinyl cyclohexene sulfide, butadiene monoepisulfide, and/or 3,4 - epoxy - 1,2 - butylene sulfide can be made from monomeric mixtures containing about 3% to 20% by weight of one or more of the latter fine monomers and such interpolymers can be cured by conventional vulcanization techniques to form useful elastomers. Polymers of propylene sulfide and/or butylene sulfide can be made by the present process which are useful elastomeric materials which may be formed into flexible films.

Details of the polymerization process are given in the specific examples set forth below. In general, the polymerization process is executed by bringing the monomeric episulfide or mixture of episulfides into contact with the catalysts described above, that is, by polymerizing the monomer charge in the presence of one or more of the catalysts. It is preferable, in order to obtain optimum results, that the starting monomeric materials be freshly distilled just prior to use from a reducing agent such as calcium hydride to remove oxidation products, carbon dioxide and other impurities. The catalyst is used to the extent of about 0.01 to 10% by weight of the monomeric material(s) being polymerized. The preferred amount of catalyst is about 0.1 to 5% by weight. The polymerization can be carried out over a wide temperature range, the preferred temperature range being about 45 to 80° C. Depending upon the reaction conditions and the nature of the monomeric material, the reaction may take about 1 to 72 hours at 45 to 80° C.

The polymerization reaction may be conducted without using a solvent, as in a bulk process or in water or methanol to form latex-type product suspensions, or any of various other inert organic solvents can be used in a solution polymerization process such as aromatic hydrocarbons, e.g., benzene, toluene, or xylene; aliphatic hydrocarbons, e.g., isopentane, n-hexane, or octane; or chlorinated hydrocarbons, e.g., carbon tetrachloride, methylene chloride, or ethylene chloride. When using a water soluble catalyst such as cadmium acetate or cadmium sulfate, it is preferable, when using a solution polymerization process, to use a non-aqueous solvent medium. The solvent is used to help regulate the rate of the reaction, where desired, by aiding in a dissipation of heat of the reaction. The reaction mixture may be agitated to facilitate reaction. The pressure at which the reaction is carried out does not appear to be particularly critical. Thus the reaction can be conducted in an open vessel at atmospheric pressure or in a closed vessel under autogenous pressure. In modifications of the process wherein a solvent is used, the reaction vessel is desirably charged with solvent, catalyst and monomer, although this particular order of addition is not critical to the successful practice of this invention. Where water is used as part of the recipe it is often desirable although not necessary to the practice here taught to add a surface active agent thereto, which may act as a dispersant for the particles of the polymer that are formed so as to prevent a too rapid acretion and agglomeration of the particles as they form. Dispersants which may be used include the anionic, cationic and non-ionic materials, such as, alkyl aryl polyether alcohols and the long chain alkyl sulfonate and sulfate salts.

In order to point out more fully the nature of the present invention, the following specific examples are given. These examples are merely illustrative of the present invention and are not intended as a limitation upon the scope thereof. In many of the experiments, the product polymer contained physically bound solvent which was removed by washing with water or methanol followed by evaporation, as in a vacuum oven at elevated temperatures. The polymer products obtained, where crystalline, are usually subjected to a determination of their melting range, and, where elastomeric, to a determination of their inherent viscosity.

Melting range determinations for the polymers in the examples were made with a Kofler Micro Hot Stage assembly (as sold by Arthur H. Thomas Co., Phila., Pa.) and a microscope, using a 3° C./minute temperature rise rate. The ranges stated are those temperatures at which melting starts to those temperatures at which melting is complete.

Inherent viscosity determinations for the polymers in the examples were made using Ubbelhode viscometers.

Two general polymerization and product recovery procedures were used in the examples given below and these procedures are hereafter designated as Polymerization Procedures I and II. A description of these procedures follow.

*Polymerization Procedure I*

A one liter stainless steel reaction vessel is sequentially charged with the solvent, monomer(s) and cadmium salt catalyst. The internal space above the charge components is then sparged with nitrogen gas. The reactor is then sealed, placed in a constant temperature bath and tumbled end over end for a specific time interval. The reactor is then cooled to ambient temperatures, opened and the product contents discharged. The product is then dried at 50° C. and at reduced pressures (less than 5 mm. Hg) to a constant weight.

*Polymerization Procedure II*

(A) A 30 fluid ounce glass bottle reaction vessel is sequentially charged with the cadmium salt catalyst, the solvent system and the monomer(s) where no dispersant is employed. (B) Where a dispersant forms part of the polymerization charge the glass vessel is charged with dispersant, solvent system, catalyst and monomer(s) in that order. The reactor is then sealed, placed in a constant temperature bath and tumbled end over end for a specific time interval. The reactor is then permitted to cool to ambient temperatures and then opened. The product contents are then discharged into methanol and swirled to remove solvent values and unreacted monomer(s). The solid polymer product is then separated by decantation of the first methanol washings, subdivided into small particles and then further washed twice with methanol by swirling and decantation. The solid polymer product is then dried at 50° C. and at reduced pressures (less than 5 mm. Hg) to a constant weight. The dried product is then dissolved in chloroform, filtered to remove catalyst residues, and evaporated to dryness.

Using these two procedures the following were run using the indicated polymerization charge recipes and reaction conditions.

| Example | 1 | 2 | 3 | 4 | 5 | 6 | 7 | 8 | 9 | 10 | 11 |
|---|---|---|---|---|---|---|---|---|---|---|---|
| Polymerization Charge Recipe: | | | | | | | | | | | |
| Ethylene Sulfide in g | 25.115 | 25.115 | | | | | | | | | |
| Propylene Sulfide in g | | | 47.4 | 47.4 | 47.4 | 47.4 | 47.4 | 47.4 | 47.4 | 47.4 | 47.4 |
| Cadmium Salt in g.: | | | | | | | | | | | |
| Sulfide | 1.78 | 2.4 | 0.2 | 0.2 | 0.2 | | | | | | |
| Silicate | | | | | | 0.2 | 0.2 | | | | |
| Hydroxide | | | | | | | | 0.2 | 0.2 | 0.2 | 0.2 |
| Solvent, in ml.: | | | | | | | | | | | |
| Benzene | 100 | 100 | 90 | 85 | | 90 | 85 | 90 | 85 | 90 | |
| Water | | | | 5 | 85 | | 5 | | 5 | | |
| Methanol | | | | | | | | | | | 25 |
| Polymerization Procedure | I | I | II | II | II | II | II | II | II | II | II |
| Polymerization Conditions: | | | | | | | | | | | |
| Bath Temperature in °C | 80 | 80 | 65 | 65 | 65 | 65 | 65 | 65 | 65 | 65 | 80 |
| Polymerization time in hours | 2 | 2 | 16 | 16 | 16 | 17 | 17 | 16 | 16 | 16 | 1 |
| Polymer Product Obtained: | | | | | | | | | | | |
| Yield in g | 18.1 | 25.0 | 18.9 | 25.0 | 45.0 | 4.7 | 41.1 | 45.2 | 47.4 | 45.6 | 97 |
| State [1] | C | C | E | E | E | E | E | E | E | E | E |
| Melting range in °C | 200–213 | 197–204 | | | | | | | | | |
| Inherent viscosity at 30° C., 0.5% in chloroform | | | | | | 1.54 | 1.11 | 1.26 | 1.47 | 1.54 | |

| Example | 12 | 13 | 14 | 15 | 16 | 17 | 18 | 19 | 20 | 21 | 22 |
|---|---|---|---|---|---|---|---|---|---|---|---|
| Polymerization Charge Recipe: | | | | | | | | | | | |
| Ethylene Sulfide in g | 200.92 | 25.115 | | | | | | | | | |
| Propylene Sulfide in g | | | 47.4 | 47.4 | 47.4 | 47.4 | 47.4 | 47.4 | 47.4 | 47.4 | 78.0 |
| Allyl Thioglycidyl ether in g | | | | | | | | | | | 24.0 |
| Cadmium Salt in g.: | | | | | | | | | | | |
| Carbonate | 5.5 | | | | | | | | | | |
| Oxide | | 1.58 | 0.2 | 0.2 | 0.2 | 0.2 | 0.2 | 0.2 | 0.2 | 0.2 | 0.2 |
| Hydroxide | | | | | | | | | | | 0.2 |
| Solvent, in ml.: | | | | | | | | | | | |
| Benzene | 200 | 100 | 85 | 60 | | | 85 | | | | 170 |
| Water | | | 5 | 30 | 90 | 90 | 5 | 90 | 90 | 90 | 10 |
| Dispersant in g.: [2] | | | | | | | | | | | |
| Triton X–100 | | | 1.0 | | | 1.0 | | | | | |
| Maprofix 963 | | | | | | | | 2.5 | | | |
| Triton X–151 | | | | | | | | | 2.5 | | |
| Triton X–155 | | | | | | | | | | 2.5 | |
| Polymerization Procedure | I | I | II | II | II | II | II | II | II | II | II |
| Polymerization Conditions: | | | | | | | | | | | |
| Bath Temperature in °C | 80 | 80 | 65 | 65 | 65 | 65 | 65 | 65 | 65 | 65 | 65 |
| Polymerization Time in Hours | 4 | 72 | 67 | 67 | 67 | 67 | 16 | 16 | 16 | 16 | 16 |
| Polymer Product Obtained: | | | | | | | | | | | |
| Yield in g | 145.0 | 25.0 | 46.6 | 46.2 | 46.4 | 45.2 | 45.7 | 35.2 | 45.9 | 40.0 | 96.6 |
| State [1] | C | C | E | E | E | E | E | E | E | E | E |
| Melting range in °C | 214–218 | 204–220 | | | | | | | | | |
| Inherent viscosity at 30° C., 0.5% in chloroform | | | 1.54 | 1.32 | 1.15 | 1.26 | 1.37 | 1.68 | 1.50 | 1.61 | |

[1] State: C indicates crystalline solid; E indicates elastomeric or rubbery solid.

[2] Dispersants used are surface active agents; Maprofix 963 is sodium lauryl sulfate; Triton X–100 and 155 are non-ionic alkyl aryl polyether alcohols, and Triton X–151 is an anionic blend of organic sulfonates and alkyl aryl polyether alcohols sold by Rohm & Haas.

EXAMPLE 23

The elastomeric copolymer of propylene sulfide and allyl thioglycidyl ether formed as in Example 22 was cured to a tough rubber. The cure recipe comprised 90 g. of the copolymer, 0.9 g. of stearic acid lubricant, 4.5 g. of zinc oxide, 45 g. of Philblack O brand carbon black, 1.8 g. of ethyl Selenac cure accelerator and 1.53 g. of sulfur curing agent. The ingredients were mixed on a mill, sheeted out and cured for 20 minutes at 300° F. to produce a snappy cured rubber. The rubber had a tensile strength of 910 p.s.i. an ultimate elongation of 65%, a Shore A hardness of 86 durometer degrees and a tear strength of 58 p.l.i.

EXAMPLE 24

In this example cadmium acetate,

$$Cd(CH_2COO)_2 \cdot 2H_2O$$

a crystalline reagent grade salt was used to polymerize propylene sulfide to form an elastomer.

A glass "soda bottle" type reaction vessel was sequentially charged with 0.2 g. of powdered cadmium acetate catalyst, 90 ml. of benzene solvent and 47.3 g. (50 ml.) of propylene sulfide monomer, then sealed and tumbled in a 65° C. bath for 16 hours. At the end of this period, the vessel was cooled, opened and the product contents poured with stirring into a beaker containing one liter of methanol. A jelly-like coagulum formed, settled to the bottom of the beaker and quickly toughened to a rubbery solid mass. The supernatant liquids were decanted, and the rubbery mass remaining were cut into ⅛ inch pieces which then were washed twice with one liter portions of methanol. The washed solids were dried to a constant weight in a vacuum oven at 60° C. and about 5 mm. Hg. The dried product obtained was a high molecular weight, water white, solid elastomeric polymer. A yield of 82% was obtained.

We claim:

1. A process comprising polymerizing at least one vicinal episulfide monomer under substantially non-alkaline conditions by contacting the monomer with, as a catalyst, at least one compound selected from the group consisting of the sulfides, silicates, acetates, sulfates, oxides and hydroxides of cadmium.
2. A process as in claim 1 wherein the polymerization is conducted in bulk.
3. A process as in claim 1 wherein the polymerization is conducted in an inert organic solvent.
4. A process as in claim 1 in which said catalyst is a water insoluble salt.
5. A process as in claim 1 in which said catalyst is an hydroxide.
6. A process as in claim 1 in which said catalyst is an oxide.
7. A process as in claim 1 in which said catalyst is a silicate.
8. A process as in claim 1 in which said catalyst is a sulfide.
9. A process as in claim 1 in which said catalyst is a water soluble salt.
10. A process as in claim 9 in which said catalyst is an acetate.
11. A process comprising polymerizing at least one monomeric vicinal episulfide under substantially non-alkaline conditions and in the presence of about 0.05 to 10% by weight of the monomer charge of at least one compound selected from the group consisting of the sulfides, silicates, acetates, sulfates, oxides, and hydroxides of cadmium and recovering the polymer product.
12. A process as in claim 1 in which said episulfide monomer is selected from the group consisting of styrene sulfide, allylthioglycidyl ether, thioepichlorohydrin, thioglycidylacrylate, thioglycidyl methacrylate, vinyl cyclohexene sufide, butadiene monoepisulfide, 3,4-epoxy-1,2-butylene sulfide and alkylene sulfides.
13. A process as in claim 12 in which at least one of said episulfide monomers is in alkylene sulfide.
14. A process as in claim 13 in which at least one of said episulfide monomers is propylene sulfide.
15. A process as in claim 14 in which at least one of said episulfide monomers is ethylene sulfide.
16. A process as in claim 12 in which at least one of said episulfide monomers is allylthioglycidyl ether.
17. A process in claim 12 in which the episulfide monomer is a mixture of propylene sulfide and allylthioglycidyl ether.
18. A process comprising polymerizing ethylene sulfide under substantially non-alkaline conditions and in the presence of about 0.01 to 10% by weight of said ethylene sulfide of at least one compound selected from the group consisting of the oxides, sulfides, silicates, acetates, sulfates and hydroxides of cadmium.
19. A process comprising polymerizing at least one episulfide monomer selected from a first group consisting of propylene sulfide, 1,2-butylene sulfide and 2,3-butylene sulfide with at least one episulfide monomer selected from a second group consisting of allylthioglycidyl ether, thioepichlorohydrin, thioglycidylacrylate, thioglycidyl methacrylate, vinyl cyclohexene sulfide, butadiene monoepisulfide, and 3,4-epoxy-1,2-butylene sulfide under substantially non-alkaline conditions and in the presence of about 0.01 to 10% by weight of said episulfide monomer of at least one compound selected from the group consisting of the oxides, sulfides, silicates, acetates, sulfates and hydroxides of cadmium.
20. A process as in claim 19 in which the episulfide monomer from said first group is propylene sulfide.
21. A process as in claim 19 in which the episulfide monomer from said second group is allylthioglycidyl ether.

References Cited

UNITED STATES PATENTS

| | | | |
|---|---|---|---|
| 2,183,860 | 12/1939 | Coltof | 260—79 |
| 2,185,660 | 1/1940 | Coltof | 260—79 |
| 2,891,072 | 6/1959 | Remes et al. | 260—327 |
| 3,000,865 | 9/1961 | Gurgiolo | 260—79 |

JOSEPH L. SCHOFER, *Primary Examiner.*

JOSEPH R. LIBEBRMAN, *Examiner.*

R. A. BURROUGHS, J. F. McNALLY, D. K. DENENBERG, *Assistant Examiners.*